United States Patent [19]

Dombchik

[11] 4,055,560
[45] Oct. 25, 1977

[54] SULFOPHENYL-AZO-PHENYL-AZO-(4-HYDROXYALKOXYPHENYL) COMPOUNDS

[75] Inventor: Steven Arnold Dombchik, Wilmington, Del.

[73] Assignee: E. I. Du Pont de Nemours and Company, Wilmington, Del.

[21] Appl. No.: 495,803

[22] Filed: Aug. 8, 1974

Related U.S. Application Data

[63] Continuation-in-part of Ser. No. 260,798, June 8, 1972, abandoned.

[51] Int. Cl.² ............................................. C09B 43/00
[52] U.S. Cl. .................................... 260/186; 260/205; 260/206
[58] Field of Search ................ 260/174, 177, 184, 186

[56]  References Cited
U.S. PATENT DOCUMENTS

| | | | |
|---|---|---|---|
| 2,134,521 | 10/1938 | Knight | 260/186 |
| 3,676,050 | 7/1972 | James | 260/186 X |
| 3,708,596 | 1/1973 | Happe et al. | 260/185 X |
| 3,862,119 | 1/1975 | Stingl | 260/186 |
| 3,932,376 | 1/1976 | Feeman | 260/186 |
| 3,932,378 | 1/1976 | Fasciati | 260/174 |

FOREIGN PATENT DOCUMENTS

| | | | |
|---|---|---|---|
| 1,201,546 | 8/1970 | United Kingdom | 260/186 |
| 609,275 | 9/1948 | United Kingdom | 260/186 |
| 882,533 | 11/1961 | United Kingdom | 260/186 |

*Primary Examiner*—Charles F. Warren

[57]  ABSTRACT

Yellow to orange, disazo acid dyes which have excellent application and fastness properties on nylon fibers, do not change shade under basic conditions and have the formula

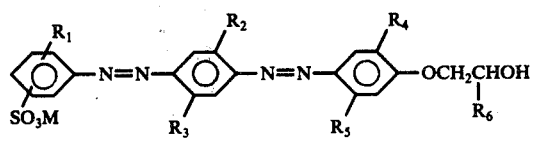

wherein $SO_3M$ is meta or para to the azo group, $R_1$ is selected from H, $CH_3$, $OCH_3$ and Cl, $R_2$ and $R_3$ are independently selected from H, $CH_3$ and $OCH_3$, $R_4$ and $R_5$ are independently selected from H, Cl and $CH_3$, but only one can be Cl, $R_6$ is selected from $CH_3$ and $C_2H_5$ and M is, $C_{1-4}$ alkylammonium and $C_{1-2}$ alkanolammonium cations.

9 Claims, No Drawings

SULFOPHENYL-AZO-PHENYL-AZO-(4-HYDROXYALKOXYPHENYL) COMPOUNDS

CROSS-REFERENCE TO RELATED APPLICATION

This is a continuation-in-part of application Ser. No. 260,748 filed June 8, 1972 and expressly abandoned Oct. 31, 1974.

BACKGROUND OF THE INVENTION

1. Field of the Invention

This invention relates to water soluble, yellow to orange disazo acid dyes which exhibit excellent fastness properties on nylon fibers and which are resistant to shade change under basic conditions.

2. Description of the Prior Art

U.S. Pat. No. 3,485,814 discloses disazo acid dyes, prepared by coupling a monosulfonated monoazo amine to phenol or a substituted phenol, as useful dyes for nylon, producing level, yellow to orange shades of good fastness to light and atmospheric contaminants such as nitrogen oxides and ozone. Since under basic conditions these dyes suffer a change of shade, they cannot be used on nylon styling yarns containing basic, deep-dyeable nylon fibers which have more amine end groups then carboxylic acid end groups. On such nylons, these dyes turn red, become dull and undergo a drastic decrease in lightfastness.

British Pat. No. 1,201,546 and Belgian Pat. No. 737,244 disclose phenolic, disazo monosulfonated dyes wherein the phenolic proton has been replaced with a lower alkyl group. Such dyes do not suffer a shade change under alkaline conditions but, in general, have low solubility in water. Water solubility is an important dye characteristic since dyes are preferably applied as aqueous solutions rather than as suspensions in order to obtain maximum uniformity of shade on the substrate.

Japanese Publication 72/04745 discloses yellow, phenolic disazo dyes, for polyesters, wherein the phenolic proton has been replaced with a hydroxyethyl group. These dyes, however, are insoluble in water.

SUMMARY OF THE INVENTION

It is an object of this invention to provide yellow to orange acid dyes. Another object is to provide dyes with good application and fastness properties on nylon. A further object is to provide dyes that undergo no shade change under basic conditions. Yet another object is to provide dyes with significantly improved water solubility over known dyes of similar structure. In summary, the present invention resides in dyes having the formula recited in the Abstract Of The Disclosure. Preferred dyes within said formula are those wherein $R_1$ is ortho to the azo group and $SO_3M$ is para to $R_1$.

DETAILED DESCRIPTION OF THE INVENTION

The dyes having the above formula are prepared by the reaction, under alkaline conditions, of propylene oxide or butylene oxide and a precursor, intermediate disazo dye having the above formula except that in place of the $OCH_2CH(R_6)OH$ group there is an OH group. The disazo intermediates are prepared by means of well known prior art procedures, for example, by diazotizing a sulfonated aromatic amine (such as one of those given in Table I) and coupling it under acidic conditions to an aromatic amine (such as one of those given in Table II). Coupling reactions to aniline are effected indirectly by coupling to anilinomethanesulfonic acid and then hydrolyzing off, under alkaline conditions, the methanesulfonic acid group. Finally, the monoazo amine is coupled, under alkaline conditions, to a phenol (such as one of those given in Table III).

TABLE I

| | |
|---|---|
| metanilic acid | 5-amino-2-chlorobenzenesulfonic acid |
| sulfanilic acid | 2-anisidine-5-sulfonic acid |
| 3-amino-4-chlorobenzenesulfonic acid | |

TABLE II

| | |
|---|---|
| anilinomethanesulfonic acid | 2,5-dimethoxyaniline |
| o- or m-toluidine | cresidine |
| 2,5-xylidine | 5-methoxy-2-toluidine |
| o- or m-anisidine | |

TABLE III

| | |
|---|---|
| phenol | o- or m-chlorophenol |
| o- or m-cresol | 2-chloro-5-methylphenol |
| 2,5-xylenol | |

Reaction of the disazo phenolic dye intermediate with propylene oxide or butylene oxide can be carried out at elevated temperature, preferably at about 70°–90° C., in water containing a base of sufficient strength to form the phenate ion of the intermediate. The favored base is sodium or lithium hydroxide, preferably in an amount up to about 20 mole % of the intermediate. Significantly more base than this causes an undue amount of ring opening and, hence, deactivation of the epoxide. It is sometimes advantageous to add a minor amount, up to about 35 weight %, of a water miscible organic solvent, such as ethylene glycol monoethyl ether or diethylene glycol monomethyl ether, in order to effect more complete conversion of the phenolic intermediate to the desired product. Because of the low boiling point of propylene oxide (35° C.), it is advantageous to carry out the reaction with this reagent in an autoclave although it is possible to obtain the desired product by slowly adding the epoxide to the aqueous or aqueous organic solution or slurry of the intermediate. Butylene oxide, boiling point 63° C., can be added to the reaction mixture and then heated under reflux until the reaction is complete. A molar ratio of epoxide to disazo phenol of 2:1 to 4:1 is desirable in order to obtain the optimum yield of product.

The cation associated with the sulfonic acid group of the dyes of the invention can be introduced in ways well known to those skilled in the art. For economic reasons sodium is the preferred cation but other alkali metal ions, notably lithium and potassium, can readily be employed. For example, the aforesaid phenolic disazo intermediate can be isolated as the free sulfonic acid by acidification of the reaction mixture with a strong mineral acid. In this form the intermediate has very low water solubility and can be washed with water to remove acid and inorganic salts. The solids can then be added to water with an equimolar amount of the desired alkali metal hydroxide and hydroxyalkylation can be carried out as described above, in which case the alkali metal hydroxide also serves as the basic catalyst. The product can be isolated by filtration and washed or recrystallized as necessary to remove any starting material. Significant quantities of the unreacted phenolic dye tend to dull the shade of the product under basic conditions and must, therefore, be removed. Other cations, such as ammonium or substituted ammonium cations, can be introduced by first isolating the product as the free sulfonic acid, washing the dye with water until free of acid and then titrating in water against ammonia or the appropriate amine (to give the substituted ammonium cation). Examples of possible amines include alkylamines, such as triethylamine, propylamine and N-methylbutylamine; the favored amines are the alkanolamines, such as triethanolamine, diethanolamine and N-methyldiethanolamine. Mixture of amines, or mixtures of an amine and an alkali metal hydroxide, can be employed advantageously to increase the water solubility of the dye.

The dyes of this invention not only retain the good application and fastness properties characteristic of the phenolic intermediates, but they are brighter and greener in shade. Furthermore, the yellow to orange dyes of this invention suffer no reddening and dulling of shade under basic conditions. Finally, these dyes exhibit good transfer properties (a measure of the ability of the dye to move from one site to another on the substrate during the dyeing process) on nylon. As a result, nylon can be dyed to level shades therewith. This is a particularly desirable feature since acid dyestuffs chemically combine with the nylon fiber and consequently are sensitive to varying concentrations of amine end groups and carboxylic acid end groups. In cases where physical and chemical variability occur within the nylon fibers as manufactured, acid dyes which have poor leveling properties tend to give an unacceptable "stripiness" (barre). Because of the good level dyeing properties of the dyes of this invention, use of these dyes greatly minimizes the problem of "stripiness". Surprisingly, the dyes that have been obtained by hydroxyethylating the intermediate with propylene oxide or butylene oxide often have water solubilities which are markedly superior to the corresponding ethylated dyes, while retaining practically the same application and fastness properties. Moreover, even more suprisingly, the dyes obtained by reacting the intermediate with propylene oxide or butylene oxide are often considerably more water soluble than those that are end capped with ethylene oxide, and they exhibit improved buildup on nylon while maintaining equivalent fastness properties.

In the following examples parts are by weight. The water solubilities of the dyes described in the examples were determined by stirring a sample of the unstandardized dye in a measured volume of water at room temperature (25° C.) for 3 hours, removing the undissolved dye by filtration and comparing the optical density of the clarified filtrate with that of a solution of the dye of known concentration.

EXAMPLE 1

A mixture of 20 parts of the sodium salt of the dye obtained by coupling 4-aminoazobenzene-3′-sulfonic acid to phenol, 250 parts of water and 2.5 parts of 30% aqueous sodium hydroxide solution was heated to 70° C. and then treated with 8.5 parts of 1,2-butylene oxide. After stirring at 70° C. for 8 hours thin layer chromatography (TLC) showed that some starting material was still present. Additions of small amounts of butylene oxide were made at intervals while the reaction mixture was stirred at 70° C. until practically all the starting material had been consumed. The reaction mixture was cooled and the solids were collected by filtration, washed with dilute aqueous sodium hydroxide and then with water, until alkali free, and dried. The yield of product was 12.1 parts. TLC indicated one colored component which, unlike the starting material, did not change shade when exposed to ammonia fumes. The dye had an absorptivity (in dimethylacetamide-water = 4:1) of 86 liters/gram/cm. at 385 m$\mu$. Calculated for $C_{22}H_{21}N_4O_5SNa$: C, 55.5; H, 4.4; N, 11.8; S, 6.7%. Found: C, 54.7; H, 4.5; N, 11.3; S, 6.7%. The cold water solubility of the dye was found to be about 300 times greater than that of the corresponding ethylated analogue.

EXAMPLE 2

A mixture of 45 parts of the sodium salt of the dye obtained by coupling 3methoxy-4-aminoazobenzene-3′-sulfonic acid to o-cresol, 18 parts of butylene oxide, 1.3 parts of 30% aqueous caustic soda and 150 parts of water was heated to the reflux temperature (70° C.) for 10 hours. The solids were isolated by filtration, washed with water, reslurried in dilute aqueous caustic soda, isolated by filtration, washed with water and dried. The chromatographically pure dye having the empirical formula $C_{24}H_{25}N_4O_7SNa$ had an absorptivity of 52 liters/gram/cm. at 410 m$\mu$. Its cold water solubility was about 700 times as great as the corresponding ethyl analogue.

EXAMPLE 3

3-Methoxy-4-aminoazobenzene-3′-sodium sulfonate (165 parts) was diazotised with sodium nitrite in dilute hydrochloric acid in conventional fashion and the diazo compound was isolated by filtration and washed with water. The diazo wet cake was then added in portions to a solution of 58 parts of o-cresol and 21 parts of lithium hydroxide monohydrate in 600 parts of water at 25° C. The resulting aqueous mixture was treated with 2 parts of lithium hydroxide monohydrate, 83 parts of butylene oxide and heated to the reflux temperature for 10 hours. The product dye was isolated and purified as described in the previous examples. The dye having the empirical formula $C_{24}H_{25}N_4O_7SLi$ had an absorptivity of 58 liters/gram/cm. at 408 m$\mu$ and a cold water solubility about the same as that of the product of Example 2 (the sodium salt).

EXAMPLES 4–10

The dyes of Examples 4–10 were prepared as the sodium salts by procedures similar to those described in the preceding examples. In the following table summarizing the results of these experiments the symbols are the same as those in the formula previously given. Further, regarding the dyes represented in the table, $R_1$ is ortho to the azo group and $SO_3Na$ is meta or para to the azo group but not ortho to $R_1$. The last column in the table shows the ratio of the cold water solubilities of the dye of the example and the corresponding ethyl analogue (the unhydroxylated compound).

TABLE IV

| Example No. | Position of SO$_3$Na Group | $R_1$ | $R_2$ | $R_3$ | $R_4$ | $R_5$ | $R_6$ | Absorbtivity (l./g./cm.) | $\lambda$ max. (m$\mu$) | Cold Water Solubility Ratio |
|---|---|---|---|---|---|---|---|---|---|---|
| 4 | meta | H | H | H | H | H | CH$_3$ | 83 | 385 | 370:1 |
| 5 | para | CH$_3$ | H | H | CH$_3$ | H | C$_2$H$_5$ | 72 | 400 | 5:1 |

TABLE IV-continued

| Example No. | Position of SO₃Na Group | $R_1$ | $R_2$ | $R_3$ | $R_4$ | $R_5$ | $R_6$ | Absorbtivity (l./g./cm.) | λ max. (mμ) | Cold Water Solubility Ratio |
|---|---|---|---|---|---|---|---|---|---|---|
| 6 | meta | Cl | H | CH₃ | H | H | CH₃ | 69 | 393 | 9:1 |
| 7 | meta | Cl | H | CH₃ | H | H | C₂H₅ | 60 | 392 | 8:1 |
| 8 | meta | H | OCH₃ | H | CH₃ | H | CH₃ | 48 | 410 | 700:1 |
| 9 | meta | Cl | H | H | H | CH₃ | CH₃ | 67 | 400 | 25:1 |
| 10 | meta | Cl | CH₃ | CH₃ | H | H | CH₃ | 66 | 400 | 8:1 |

The embodiments of the invention in which an exclusive property or privilege is claimed are defined as follows:

1. Yellow to orange, disazo acid dye having the formula

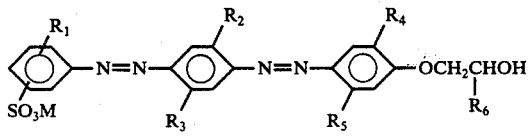

wherein SO₃M is meta or para to the azo group, $R_1$ is selected from H, CH₃, OCH₃ and Cl, $R_2$ and $R_3$ are independently selected from H, CH₃ and OCH₃, $R_4$ and $R_5$ are independently selected from H, Cl and CH₃, but only one can be Cl, $R_6$ is C₂H₅ and M is selected from H, alkali metal, ammonium, Cl-4 alkylammonium and Cl-2 alkanolammonium cations.

2. The dye of claim 1 wherein $R_1$ is ortho to the azo group and SO₃M is para to $R_1$.

3. The dye of Claim 2 wherein $R_1$, $R_2$, $R_3$, $R_4$ and $R_5$ are H, $R_6$ is C₂H₅ and M is Na.

4. The dye of claim 2 wherein $R_1$, $R_3$ and $R_5$ are H, $R_2$ is OCH₃, $R_4$ is CH₃, $R_6$ is C₂H₅ and M is Na.

5. The dye of claim 2 wherein $R_1$, $R_3$ and $R_5$ are H, $R_2$ is OCH₃, $R_4$ is CH₃, $R_6$ is C₂H₅ and M is Li.

6. The dye of claim 2 wherein $R_2$, $R_4$ and $R_5$ are H, $R_1$ is Cl, $R_3$ is CH₃, $R_6$ is C₂H₅ and M is Na.

7. The dye of claim 1 wherein $R_1$ is ortho to the azo group and SO₃M is para to the azo group.

8. The dye of claim 7 wherein $R_2$, $R_3$ and $R_5$ are H, $R_1$ and $R_4$ are CH₃, $R_6$ is C₂H₅ and M is Na.

9. The dye of claim 1 wherein $R_1$ is CH₃, OCH₃ or Cl and at least one of $R_2$, $R_3$, $R_4$ and $R_5$ is a substituent other than H.

* * * * *